(12) United States Patent
Yeh

(10) Patent No.: US 8,464,306 B2
(45) Date of Patent: Jun. 11, 2013

(54) TRANSPORT STREAM PROCESSING APPARATUS CAPABLE OF STORING TRANSPORT STREAM BEFORE THE TRANSPORT STREAM IS DESCRAMBLED AND THEN DESCRAMBLING THE STORED TRANSPORT STREAM FOR PLAYBACK

(75) Inventor: You-Min Yeh, Chi-Lung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 168 days.

(21) Appl. No.: 13/130,306

(22) PCT Filed: Dec. 12, 2008

(86) PCT No.: PCT/CN2008/073490
§ 371 (c)(1),
(2), (4) Date: May 20, 2011

(87) PCT Pub. No.: WO2010/066084
PCT Pub. Date: Jun. 17, 2010

(65) Prior Publication Data
US 2011/0225620 A1 Sep. 15, 2011

(51) Int. Cl.
*H04N 7/173* (2006.01)
*H04N 7/16* (2006.01)

(52) U.S. Cl.
USPC .......................................... 725/117; 725/147

(58) Field of Classification Search
None
See application file for complete search history.

(56) References Cited

U.S. PATENT DOCUMENTS

| 5,784,683 | A  | * | 7/1998  | Sistanizadeh et al. ........... 725/73 |
|-----------|----|---|---------|----------------------------------------|
| 6,753,758 | B2 | * | 6/2004  | Colman ........................ 340/5.6 |
| 6,853,385 | B1 | * | 2/2005  | MacInnis et al. .............. 345/629 |
| 7,039,614 | B1 | * | 5/2006  | Candelore ......................... 705/57 |
| 7,487,534 | B1 | * | 2/2009  | Peterka et al. ................. 725/131 |
| 7,492,897 | B1 | * | 2/2009  | Eskicioglu et al. ........... 380/231 |
| 7,953,872 | B2 | * | 5/2011  | Chaudhry ..................... 709/229 |
| 2001/0052130 | A1 | * | 12/2001 | Yap et al. ........................ 725/90 |
| 2006/0018633 | A1 |   | 1/2006  | Tsai |
| 2006/0184702 | A1 |   | 8/2006  | Yeh |

FOREIGN PATENT DOCUMENTS

| CN | 1755665 A | 4/2006 |
| TW | 569630 | 1/2004 |
| TW | 200744381 | 12/2007 |
| WO | 0156297 A1 | 8/2001 |
| WO | WO 2007067019 A1 | 6/2007 |

OTHER PUBLICATIONS

International application No. PCT/CN2008/073490, International application filing date: Dec. 12, 2008, International Searching Report mailing date: Sep. 10, 2009.

* cited by examiner

*Primary Examiner* — Brian Pendleton
*Assistant Examiner* — Jonathan V Lewis
(74) *Attorney, Agent, or Firm* — Winston Hsu; Scott Margo

(57) ABSTRACT

A transport stream processing apparatus includes a demodulation module, a transport stream storage module, a multiplexer, and a conditional access system interface. The demodulation module is for demodulating an input signal to generate a first transport stream. The transport stream storage module is for storing a second transport stream. The multiplexer has an output port, a first input port for receiving the first transport stream, and a second input port for receiving the second transport stream. The multiplexer selectively couples the first input port or the second input port to the output port. The conditional access system interface is coupled to the output port of the multiplexer for coupling a conditional access module. The conditional access system interface transmits a transport stream outputted from the output port of the multiplexer to the conditional access module for signal processing when the conditional access module is coupled to the conditional access system interface.

18 Claims, 13 Drawing Sheets

TRANSPORT STREAM PROCESSING APPARATUS CAPABLE OF STORING TRANSPORT STREAM BEFORE THE TRANSPORT STREAM IS DESCRAMBLED AND THEN DESCRAMBLING THE STORED TRANSPORT STREAM FOR PLAYBACK

FIELD OF INVENTION

The present invention relates to processing a transport stream derived from a digital television signal, and more particularly, to a transport stream processing apparatus capable of storing a transport stream before the transport stream is descrambled and then descrambling the stored transport stream for playback.

BACKGROUND OF THE INVENTION

Development of multiplexing techniques has enabled concurrent combination of video data, audio data, and system information which are transmitted via a transport stream. Accordingly, digital data broadcasting has overcome the problems of conventional analog broadcasting and has provided multimedia services with high added value to service subscribers. For example, the Advanced Television Systems Committee (ATSC) standard is used in United States for transmitting TV programs to receivers through broadcasting wireless communication signals, and the Digital Video Broadcasting (DVB) standard is adopted in Europe for transmitting TV programs to receivers through broadcasting wireless communication signals.

In general, the TV program content providers desire their various broadcasted multimedia data to be protected and only provided to authenticated subscribers. The conditional access system is therefore developed in order to satisfy such requirements. The conditional access system is designed for controlling each receiver (e.g., a digital television set-top box) to determine whether to give a right to present a specific broadcasted TV program to a viewer. The conditional access system is based on the transmission of programs scrambled with control words which are received by subscribers having a set-top box and a PCMCIA-like card, such as a Point of Deployment (POD) card or a CableCARD for an ATSC receiver or a Common Interface (CI) for a DTV receiver, inserted to the set-top box. The PCMCIA-like card is to allow the scrambled programs transmitted via a broadcasting wireless communication signal to be descrambled and viewed.

With the development of the digital broadcasting, the specification associated with the conditional access system might be modified, which necessitates a new processing flow for the scrambled transport stream generated from a demodulator demodulating an input signal provided through a tuner. Therefore, how to design an apparatus compatible with the updated conditional access specification becomes an important issue for the designers.

SUMMARY OF THE INVENTION

According to a first aspect of the present invention, a transport stream processing apparatus is provided. The transport stream processing apparatus includes a demodulation module, a transport stream storage module, a multiplexer, and a conditional access system interface. The demodulation module is configured for demodulating an input signal to generate a first transport stream. The transport stream storage module is configured for storing a second transport stream. The multiplexer has an output port, a first input port configured for receiving the first transport stream, and a second input port configured for receiving the second transport stream. The multiplexer selectively couples the first input port or the second input port to the output port. The conditional access system interface is coupled to the output port of the multiplexer, and is configured for coupling a conditional access module. The conditional access system interface transmits a transport stream outputted from the output port of the multiplexer to the conditional access module for signal processing when the conditional access module is coupled to the conditional access system interface.

According to a second aspect of the present invention, a transport stream processing apparatus is provided. The transport stream processing apparatus includes a transport stream storage module, a transport stream demultiplexer, a conditional access system interface, and a switch module. The transport stream storage module is configured for storing a transport stream. The transport stream demultiplexer is configured for demultiplexing information transmitted via one incoming transport stream. The conditional access system interface is coupled to the transport stream demultiplexer, and is configured for coupling a conditional access module. When the conditional access module is coupled to the conditional access system interface, the conditional access system interface transmits another incoming transport stream to the conditional access module for signal processing and transmits a processed transport stream generated from the conditional access module to the transport stream demultiplexer. The switch module has an input port coupled to the transport stream storage module for receiving the transport stream stored in the transport stream storage module, a first output port coupled to the transport stream demultiplexer, and a second output port coupled to the conditional access system interface. The switch module selectively transmits the transport stream received at the input port to the transport stream demultiplexer via the first output port or the conditional access system interface via the second output port.

According to a third aspect of the present invention, a transport stream processing apparatus is provided. The transport stream processing apparatus includes a transport stream storage module, a transport stream demultiplexer, a multiplexer, and a conditional access system interface. The transport stream storage module is configured for storing a transport stream. The transport stream demultiplexer is configured for demultiplexing information transmitted via an incoming transport stream. The multiplexer has a first input port coupled to the transport stream storage module for receiving the transport stream stored therein, a second input port, and an output port coupled to the transport stream demultiplexer. The multiplexer selectively couples the first input port or the second input port to the output port. The conditional access system interface is coupled to the transport stream storage module and the second input port of the multiplexer, and is configured for coupling a conditional access module. When the conditional access module is coupled to the conditional access system interface, the conditional access system interface transmits the transport stream to the conditional access module for signal processing and transmits a processed transport stream generated from the conditional access module to the second input port of the multiplexer.

According to a fourth aspect of the present invention, a transport stream processing apparatus is provided. The transport stream processing apparatus includes a first transport stream storage, a second transport stream storage, a conditional access system interface, and a transport stream demultiplexer. The first transport stream storage is configured for storing a first transport stream. The second transport stream storage is configured for storing a second transport stream, where the second transport stream storage is physically independent of the first transport stream storage. The conditional access system interface is coupled to the second transport stream storage, and is configured for coupling a conditional access module. When the conditional access module is coupled to the conditional access system interface, the conditional access system interface transmits the second transport stream stored in the second transport stream storage to the conditional access module for signal processing, and outputs a processed transport stream generated from the conditional access module. The transport stream demultiplexer is coupled to the first transport stream storage and the conditional access system interface, and is configured for demultiplexing information transmitted via the first transport stream or the processed transport stream.

According to a fifth aspect of the present invention, a transport stream processing apparatus is provided. The transport stream processing apparatus includes a demodulation module, a transport stream storage module, a transport stream demultiplexer, and a conditional access module. The demodulation module is configured for demodulating an input signal to generate a first transport stream. The transport stream demultiplexer is coupled to the demodulation module, and is configured for processing the first transport stream to thereby record a second transport stream into the transport stream storage module, wherein the second transport stream is scrambled.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the transport stream processing apparatus shown in FIG. 1 that is operated in a condition where no conditional access module is plugged in.

FIG. 3 is a diagram illustrating the transport stream processing apparatus shown in FIG. 1 that is operated in a condition where a CI/POD card is plugged in.

FIG. 4 is a diagram illustrating the transport stream processing apparatus shown in FIG. 1 that is operated in a condition where a CI+ card is plugged in.

FIG. 6 is a diagram illustrating the transport stream processing apparatus in FIG. 5 that is operated in a condition where no conditional access module is plugged in.

FIG. 7 is a diagram illustrating the transport stream processing apparatus in FIG. 5 that is operated in a condition where a CI/POD card is plugged in.

FIG. 8 is a diagram illustrating the transport stream processing apparatus in FIG. 5 that is operated in a condition where a CI+ card is plugged in.

FIG. 10 is a diagram illustrating the transport stream processing apparatus in FIG. 9 that is operated in a condition where no conditional access module is plugged in.

FIG. 11 is a diagram illustrating the transport stream processing apparatus in FIG. 9 that is operated in a condition where a CI/POD card is plugged in.

FIG. 12 is a diagram illustrating the transport stream processing apparatus in FIG. 9 that is operated in a condition where a CI+ card is plugged in.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . .". Also, the term "couple" is intended to mean either an indirect or direct electrical connection. Accordingly, if one device is coupled to another device, that connection may be through a direct electrical connection, or through an indirect electrical connection via other devices and connections.

The present invention provides a transport stream processing apparatus compatible with different condition access system specifications. Specifically, the transport stream processing apparatus of the present invention is a cost effective system that could handle the Personal Video Record (PVR) function and the playback function of the recorded transport stream under a condition where a Common Interface Plus (CI+) card is plugged in, a condition where a CI/POD card is plugged in, or a condition where no card is plugged in. And the present invention could also handle both scrambled TS stored in the transport stream storage module and descrambled TS stored in the transport stream storage. Further details are given as follows.

Figure 1:
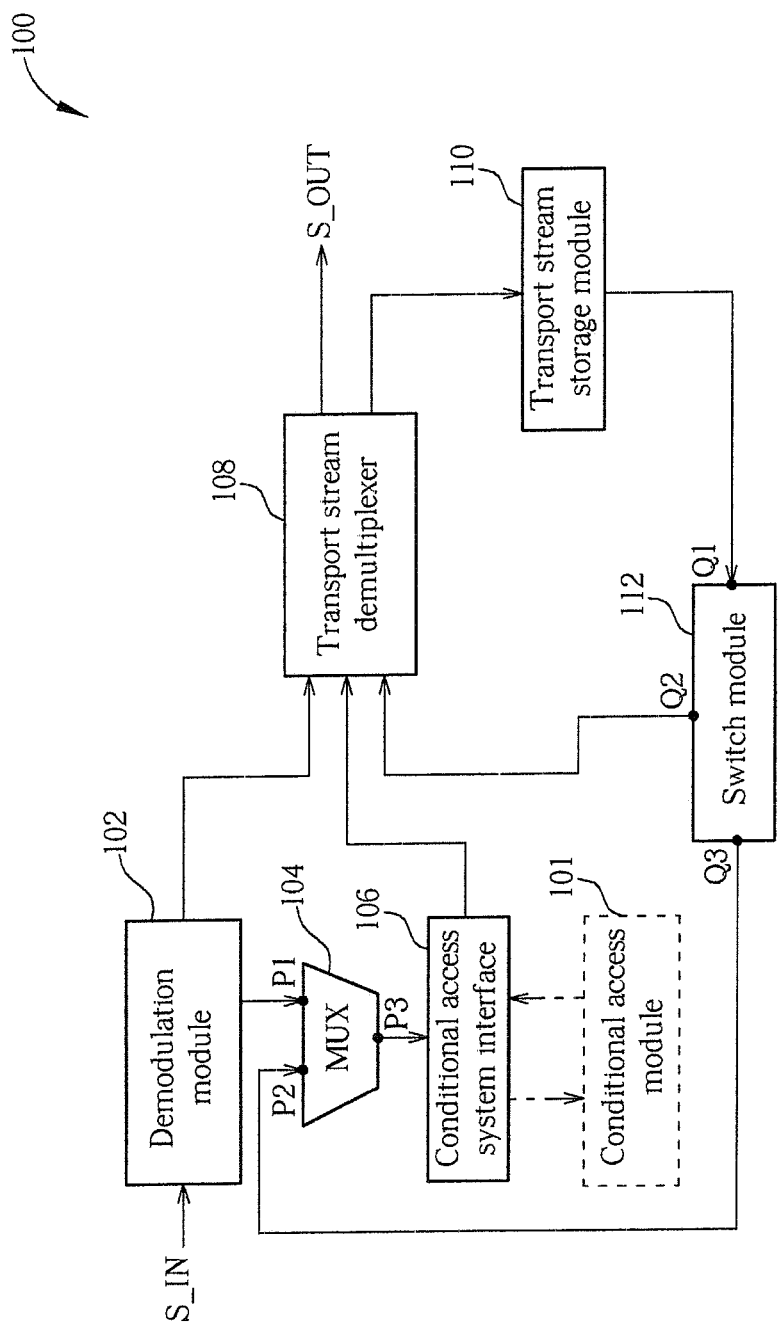
FIG. 1 is a diagram illustrating a first exemplary embodiment of a transport stream processing apparatus according to the present invention.

FIG. 1 is a diagram illustrating a first exemplary embodiment of a transport stream processing apparatus according to the present invention. The transport stream processing apparatus 100 includes, but is not limited to, a demodulation module 102, a multiplexer (MUX) 104, a conditional access system interface 106, a transport stream demultiplexer 108, a transport stream storage module 110, and a switch module 112. The demodulation module 102 receives an input signal S_IN from a preceding component (e.g., a tuner implemented for receiving a wireless communication signal broadcasted by a TV program content provider and then down-converting the received wireless communication signal into the input signal S_IN), and then demodulates the received input signal S_IN. The output of the demodulation module 102 is transmitted to the multiplexer 104 or the transport stream demultiplexer 108, depending on an operational status of the transport stream processing apparatus 100. As shown, the multiplexer 104 has two input ports P1, P2 and an output port P3, and the switch module 112 has an input port Q1 and two output ports Q2, Q3. The multiplexer 104 selectively couples the output port P3 to either the input port P1 or the input port P2, where the input port P1 is coupled to the demodulation module 102 for receiving an output of the demodulation module 102, the input port P2 is coupled to the output port Q3 of the switch module 112 for receiving a recorded transport stream, and the output port P3 is coupled to the conditional access system interface 106. The switch module 112 selectively couples the input port Q1 to either the output port Q2 or the output port Q3, where the input port Q1 is coupled to the transport stream storage module 110 for receiving a transport stream recorded in the transport stream storage module 110. In other words, the switch module 112 is implemented to transmit the recorded transport stream in the transport stream storage module 110 to either the transport stream demultiplexer 108 or the input port P2 of the multiplexer 104. The conditional access system interface 106 is used to couple a conditional access module 101, such as a PCMCIA-like card complying with the POD specification, the CI specification, or the Common Interface Plus (CI+) specification. When the conditional access module 101 is coupled to the conditional access system interface 106, it can descramble the scrambled transport stream given by a content provider, thereby allowing the protected TV program to be played back on a display. Therefore, when the conditional access module 101 is coupled to the conditional access system interface 106, the conditional access system interface 106 transmits an output of the multiplexer 104 to the conditional access module 101 for signal processing, and then transmits a processed transport stream (e.g., a transport stream which has been handled using a descrambling process) to the transport stream demultiplexer 108 for further signal processing.

The transport stream demultiplexer 108 is coupled to the demodulation module 102, the conditional access system interface 106, and the output port Q2 of the switch module 112, and is implemented to perform a Personal Video Record (PVR) operation to record audio data, video data, and system information in the form of a transport stream, and perform a demultiplexing operation to demultiplex video data, audio data, and system information transmitted via a recorded transport stream. In addition, the transport stream demultiplexer 108 could also perform a filtering operation to extract desired packets included in an incoming transport stream, an encryption operation upon a transport stream before the transport stream is recorded into the transport stream storage module 110, and a decryption operation upon the encrypted transport stream before the encrypted transport stream is outputted.

In this exemplary embodiment, the transport stream demultiplexer 108 selectively performs the PVR operation upon an output of the demodulation module 102 or an output of the conditional access system interface 106 to thereby record a transport stream into the transport stream storage module 110. For example, the transport stream demultiplexer 108 processes an output of the demodulation module 102 to thereby record a transport stream into the transport stream storage module 110 when no conditional access module is coupled to the conditional access system interface 106 or the conditional access module 101 is coupled to the conditional access system interface 106 and complies with a second conditional access specification (e.g., the CI+ specification), and processes an output of the conditional access module 106 to thereby record the processed transport stream into the transport stream storage module 110 when the conditional access module 101 is coupled to the conditional access system interface 106 and complies with a first conditional access specification (e.g., the POD/CI specification) different from the second conditional access specification.

In addition, the transport stream demultiplexer 108 is also implemented for selectively demultiplexing information transmitted via an output of the conditional access system interface 106 or the recorded transport stream in the transport stream storage module 110 to thereby generate an output signal S_OUT. For example, the transport stream demultiplexer 108 performs the demultiplexing operation upon the transport stream stored in the transport stream storage module 110 when no conditional access module is coupled to the conditional access system interface 106 or the conditional access module 101 is coupled to the conditional access system interface 106 and complies with the first conditional access specification (e.g., the POD/CI specification), and performs the demultiplexing operation upon a processed transport stream generated from the conditional access module 101 when the conditional access module 101 is coupled to the conditional access system interface 106 and complies with the second conditional access specification (e.g., the CI+ specification). Further, the transport stream demultiplexer 108 is also capable of performing the demultiplexing operation upon an output of the demodulation module 102 to thereby generate an output signal S_OUT to the following signal processing stage such as decoding and displaying.

Figure 2:
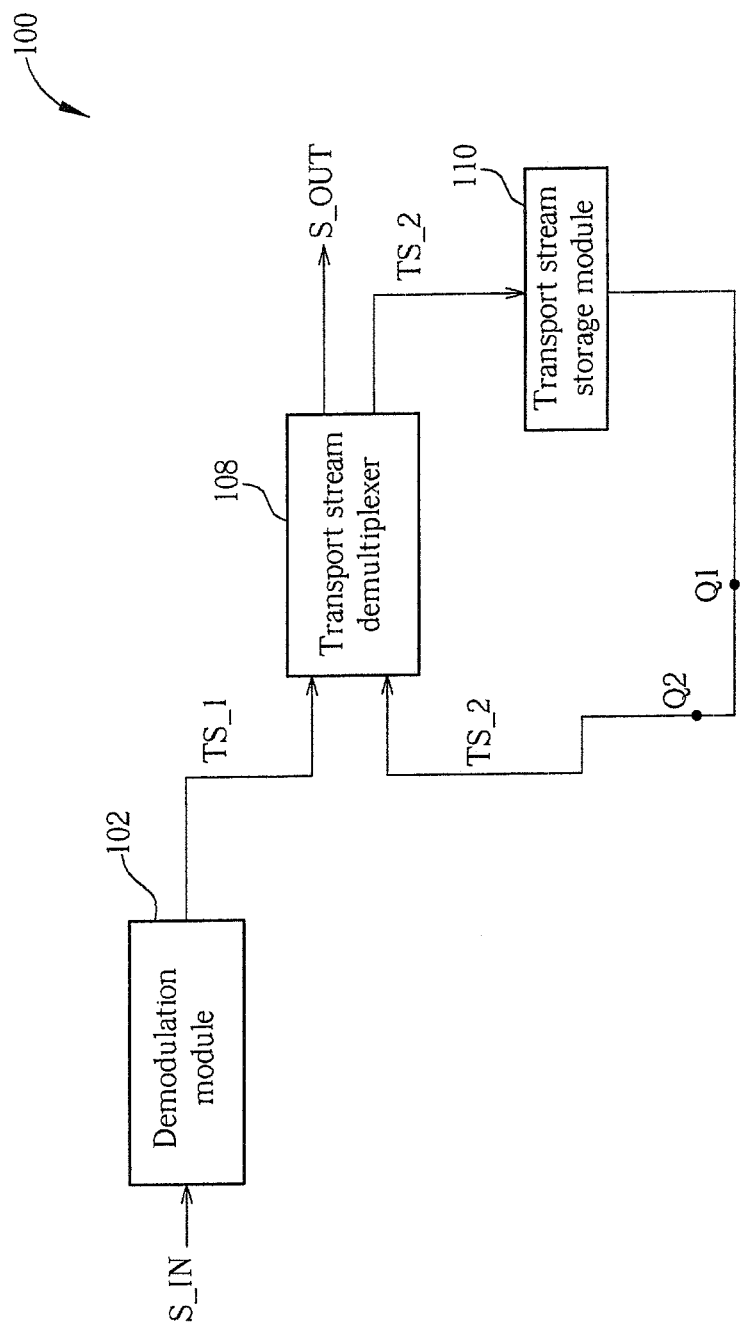

The exemplary transport stream processing apparatus 100 shown in FIG. 1 can handle the PVR function for recording a transport stream and the playback function of the recorded transport stream under different conditions. Please refer to FIG. 2 in conjunction with FIG. 1. FIG. 2 is a diagram illustrating the transport stream processing apparatus 100 in FIG. 1 operating with no conditional access module is plugged in. As there is no conditional access module coupled to the conditional access system interface 106, the demodulation module 102 demodulates the input signal S_IN to generate a first transport stream TS_1 to the transport stream demultiplexer 108. The transport stream demultiplexer 108 performs the PVR operation upon the first transport stream TS_1 to thereby record a second transport stream TS_2 into the transport stream storage module 110. In this exemplary embodiment, the switch module 112 is controlled to couple the input port Q1 to the output port Q2. Regarding the playback of the second transport stream TS_2 recorded in the transport stream storage module 110, the transport stream demultiplexer 108 demultiplexs information transmitted via an incoming transport stream (e.g., the recorded second transport stream TS_2) to generate the output signal S_OUT to the following signal processing stage. For example, the system information included in the second transport stream TS_2 is outputted to a micro-controller (not shown), the audio data included in the second transport stream TS_2 is outputted to an audio decoder (not shown), and the video data included in the second transport stream TS_2 is outputted to a video decoder (not shown).

Figure 3:
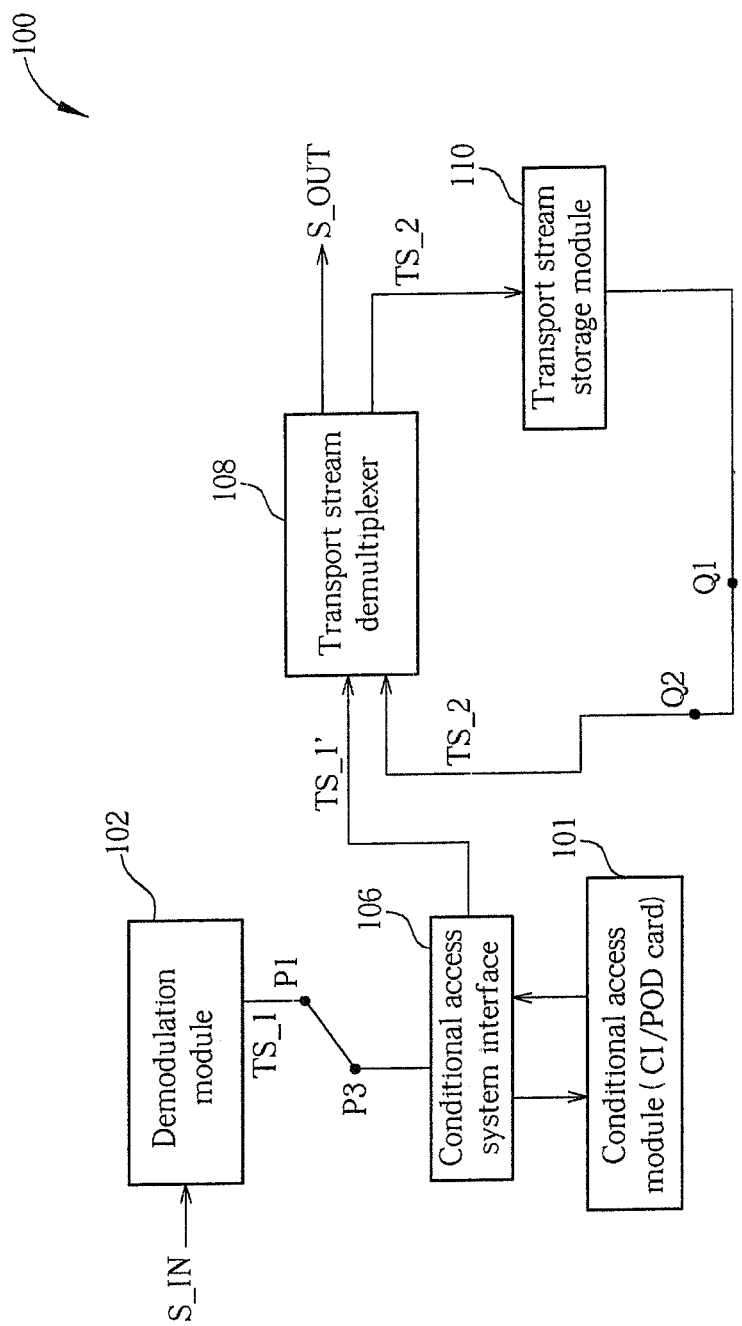

Please refer to FIG. 3 in conjunction with FIG. 1. FIG. 3 is a diagram illustrating the transport stream processing apparatus 100 in FIG. 1 operating with a CI/POD card plugged in. In this exemplary embodiment, the conditional access module 101 complying with the CI or POD specification is connected to the conditional access system interface 106. Therefore, the multiplexer 104 is controlled to couple the input port P1 to the output port P3, and the switch module 112 is controlled to couple the input port Q1 to the output port Q2. The demodulation module 102 demodulates the input signal S_IN to generate a first transport stream TS_1 to the conditional access module 101 for signal processing (e.g., descrambling). Next, the conditional access system interface 106 transmits a processed transport stream TS_1' generated from the conditional access module 101 to the transport stream demultiplexer 108. The transport stream demultiplexer 108 then performs the PVR operation upon the processed transport stream TS_1' to thereby record a second transport stream TS_2 into the transport stream storage module 110. It is noted that the second transport stream TS_2 stored in the transport stream storage module 110 in this condition may be a descrambled TS. Regarding the playback of the second transport stream TS_2 recorded in the transport stream storage module 110, the transport stream demultiplexer 108 demultiplexs information transmitted via an incoming transport stream (e.g., the recorded second transport stream TS_2) to generate the output signal S_OUT to the following signal processing stage for further signal processing.

Figure 4:
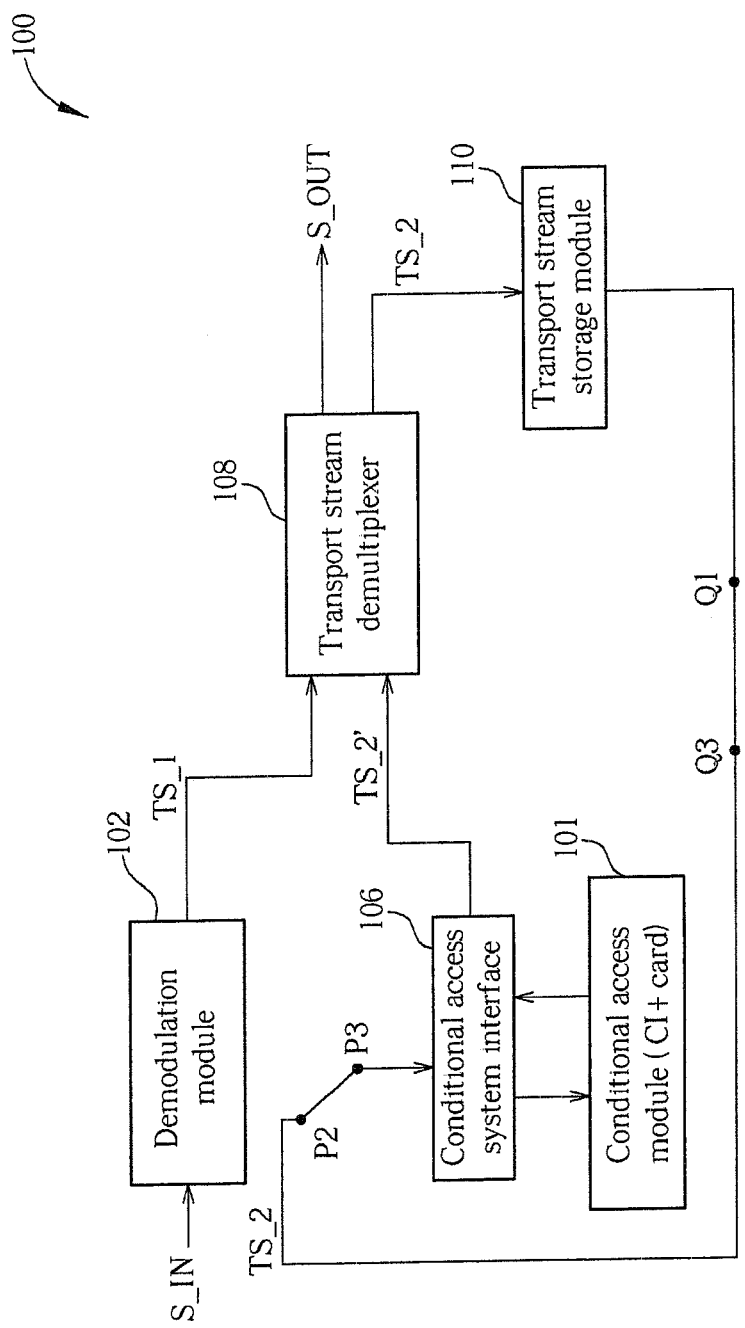

Please refer to FIG. 4 in conjunction with FIG. 1. FIG. 4 is a diagram illustrating the transport stream processing apparatus 100 in FIG. 1 operating with a CI+ card plugged in. In this exemplary embodiment, the conditional access module 101 complying with the CI+ specification is connected to the conditional access system interface 106. Therefore, the multiplexer 104 is controlled to couple the input port P2 to the output port P3, and the switch module 112 is controlled to couple the input port Q1 to the output port Q3. The demodulation module 102 demodulates the input signal S_IN to generate a first transport stream TS_1 to the transport stream demultiplexer 108. The transport stream demultiplexer 108 then performs the PVR operation upon the first transport stream TS_1 to thereby record a second transport stream TS_2 into the transport stream storage module 110. It is noted that the second transport stream TS_2 stored in the transport stream storage module 110 in this condition may be a scrambled TS. Regarding the playback of the second transport stream TS_2 recorded in the transport stream storage module 110, the second transport stream TS_2 is transmitted to the conditional access module 101 for signal processing (e.g., descrambling), and then the conditional access system interface 106 transmits a processed transport stream TS_2' generated from the conditional access module 101 to the transport stream demultiplexer 108. Next, the transport stream demultiplexer 108 demultiplexs information transmitted via an incoming transport stream (e.g., the processed transport stream TS_2') to generate the output signal S_OUT to the following signal processing stage for further signal processing.

It should be noted that the signal processing scheme employed by the transport stream processing apparatus 100 operating with a CI+ card plugged in is not limited to the exemplary implementation shown in FIG. 4. For example, in an alternative design, the same hardware configuration shown in FIG. 3 can be employed for handling recording of the transport stream which has been processed by the conditional access module 101 and playback of the recorded transport stream in the transport stream storage module 110 when the transport stream processing apparatus 100 operates under a condition where the inserted conditional access module 101 is a CI+ card. In other words, descrambled transport stream may be recorded into the transport stream storage by the PVR operation even though the conditional access module coupled to the conditional access system interface is a CI+ card.

Figure 5:
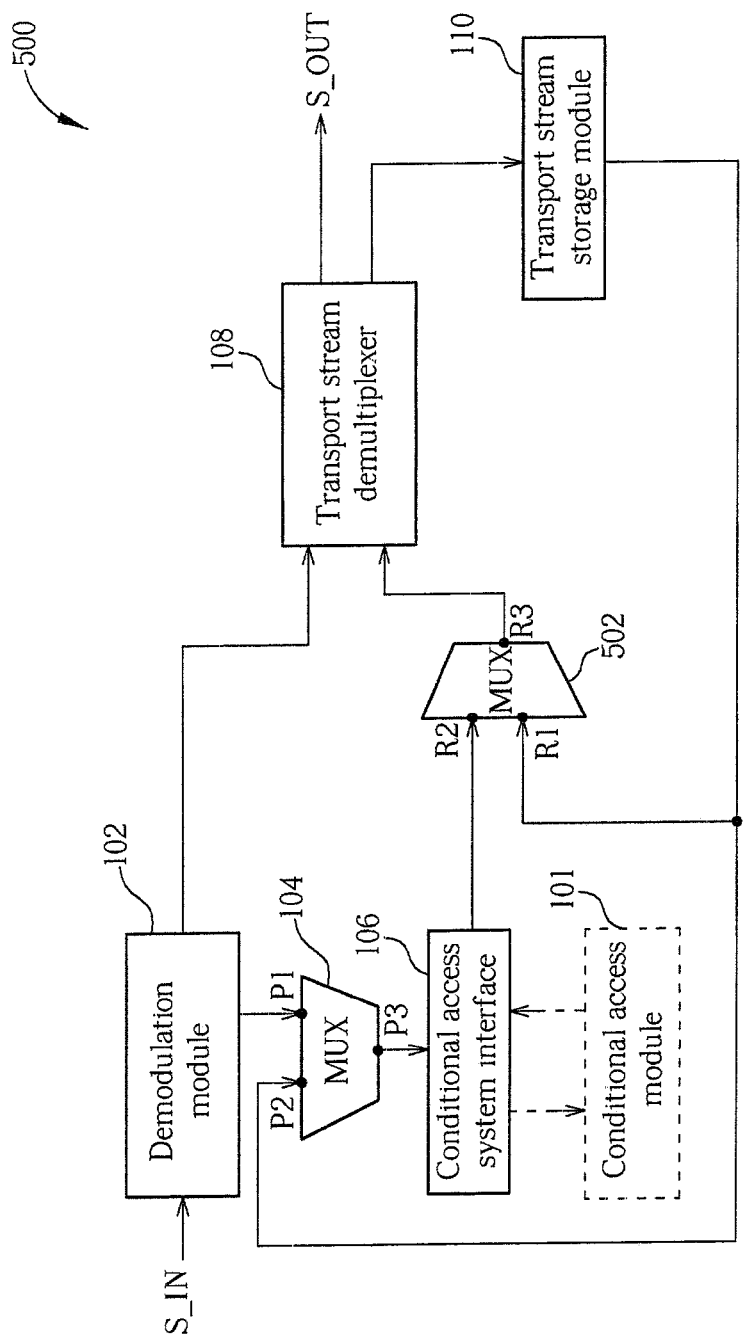
FIG. 5 is a diagram illustrating a second exemplary embodiment of a transport stream processing apparatus according to the present invention.

In the exemplary embodiment shown in FIG. 1, the delivery of the recorded transport stream in the transport stream storage module 110 is controlled by the switch module 112. However, this is for illustrative purposes only. Other alternative designs are feasible. Please refer to FIG. 5. FIG. 5 is a diagram illustrating a second exemplary embodiment of a transport stream processing apparatus according to the present invention. The configuration of the transport stream processing apparatus 500 shown in FIG. 5 is similar to that of the transport stream processing apparatus 100 shown in FIG. 1. The major difference is the multiplexer 502 which takes place of the switch module 112 to control the data path of the transport stream. As shown, the multiplexer 502 has two input ports R1, R2 and an output port R3, where the input port R1 is coupled to the transport stream storage module 110 for receiving a transport stream stored in the transport stream storage module 110, the input port R2 is coupled to the conditional access system interface 106 for receiving a processed transport stream generated from the conditional access module 101, and the output port R3 is coupled to the transport stream demultiplexer 108. The multiplexer 502 is implemented to selectively couple the output port R3 to either the input port R1 or the input port R2. In other words, the multiplexer 502 transmits either the transport stream recorded in the transport stream storage module 110 or the processed transport stream generated from the conditional access module 101 to the transport stream demultiplexer 108.

Figure 6:
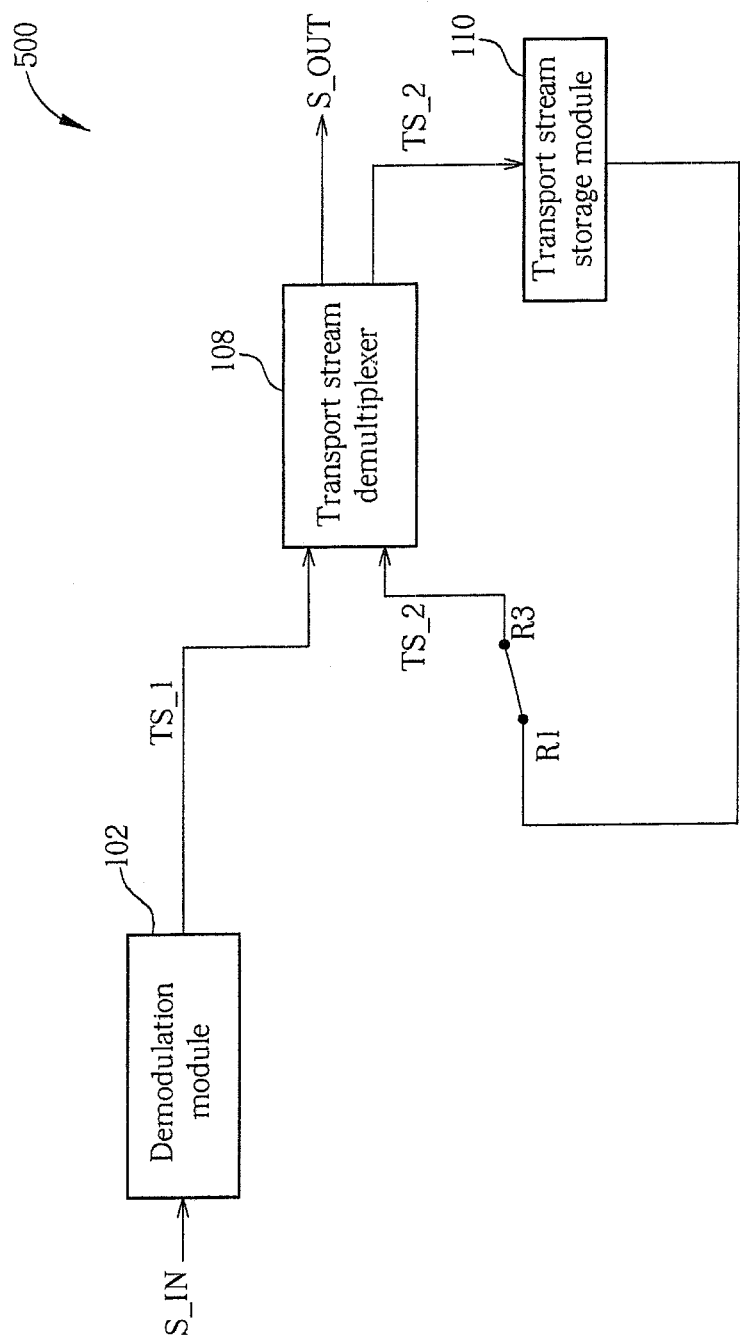
Figure 7:
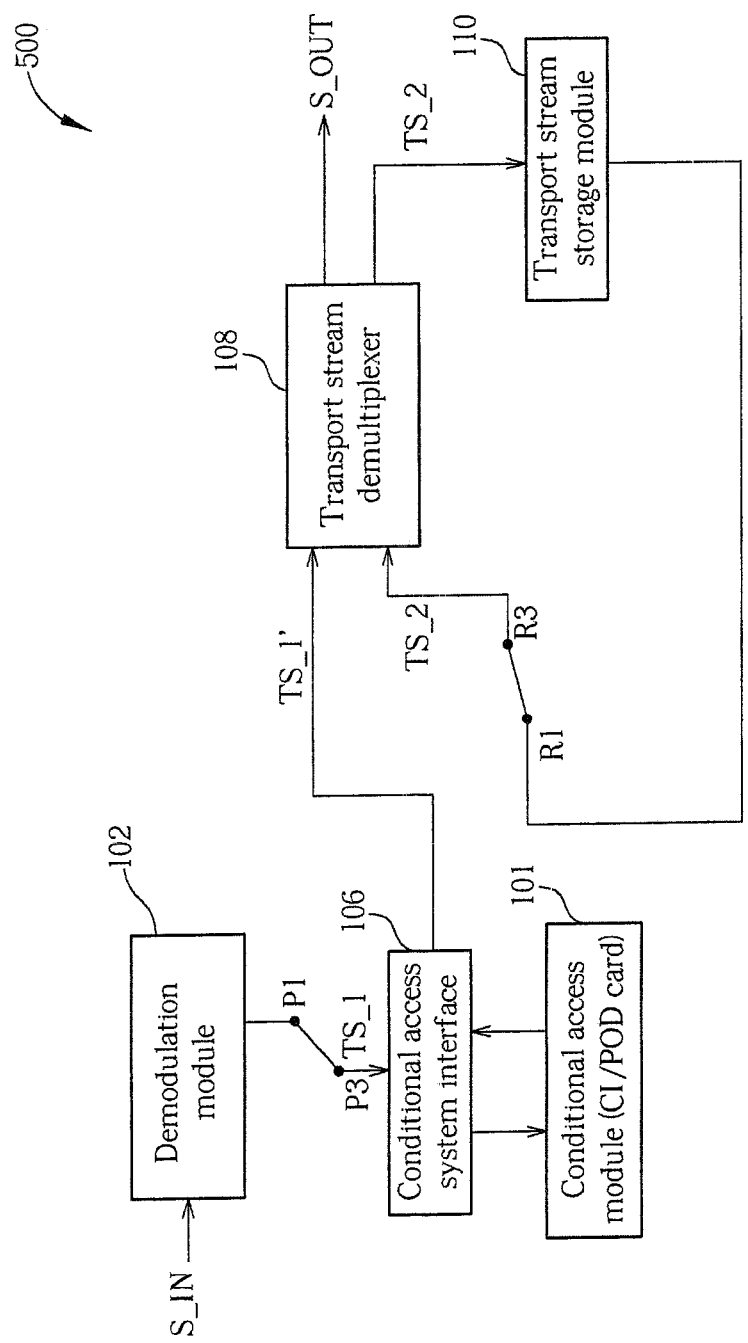
Figure 8:
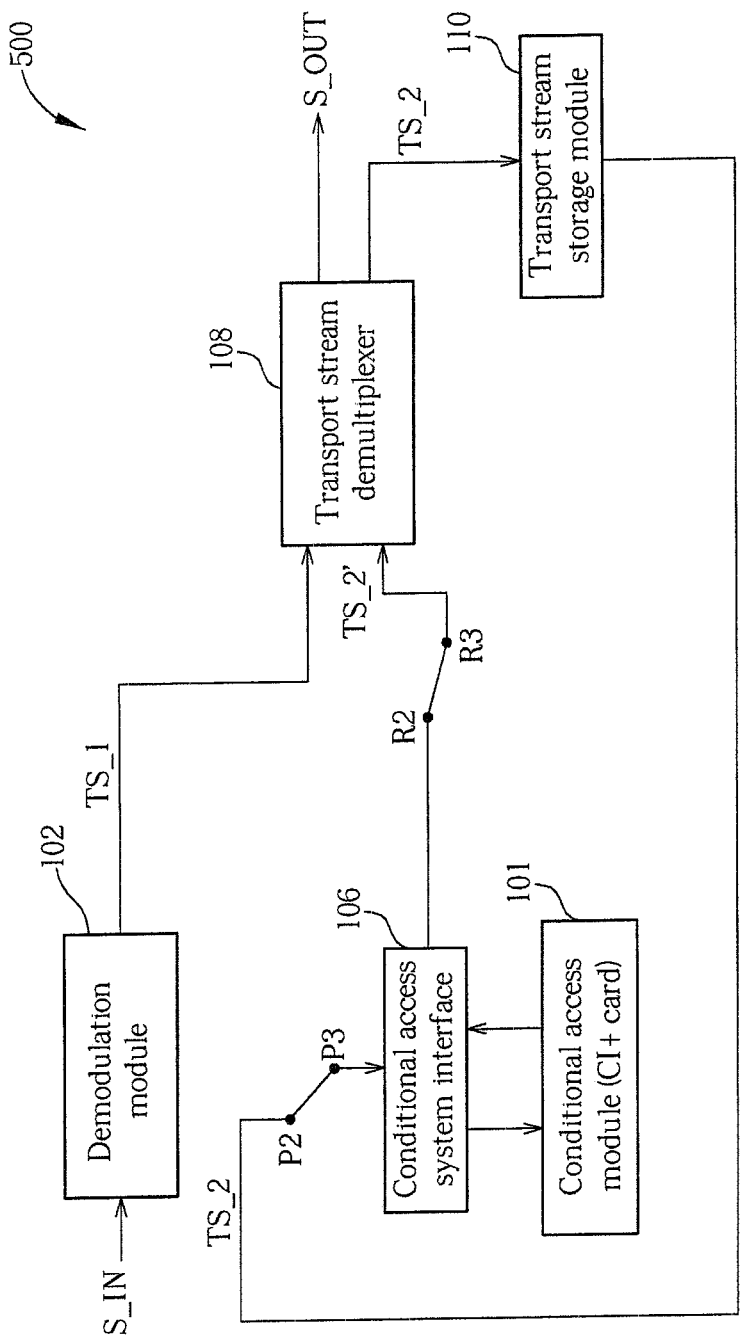

Similarly, the transport stream processing apparatus 500 shown in FIG. 5 can handle the PVR function for recording a transport stream and the playback function of the recorded transport stream under different conditions. FIG. 6 is a diagram illustrating the transport stream processing apparatus 500 in FIG. 5 operating with no conditional access module plugged in. In this exemplary embodiment, the multiplexer 502 is controlled to couple the input port R1 to the output port R3. FIG. 7 is a diagram illustrating the transport stream processing apparatus 500 in FIG. 5 operating with a CI/POD card plugged in. In this exemplary embodiment, the multiplexer 104 is controlled to couple the input port P1 to the output port P3, and the multiplexer 502 is controlled to couple the input port R1 to the output port R3. FIG. 8 is a diagram illustrating the transport stream processing apparatus 500 in FIG. 5 operating with a CI+ card plugged in. In this exemplary embodiment, the multiplexer 104 is controlled to couple the input port P2 to the output port P3, and the multiplexer 502 is controlled to couple the input port R2 to the output port R3. As a person skilled in art would readily understand the operations of the exemplary embodiments shown in FIGS. 6, 7, and 8 after reading above paragraphs directed to the exemplary embodiments shown in FIGS. 2, 3, and 4, further description is therefore omitted here for the sake of brevity.

Figure 9:
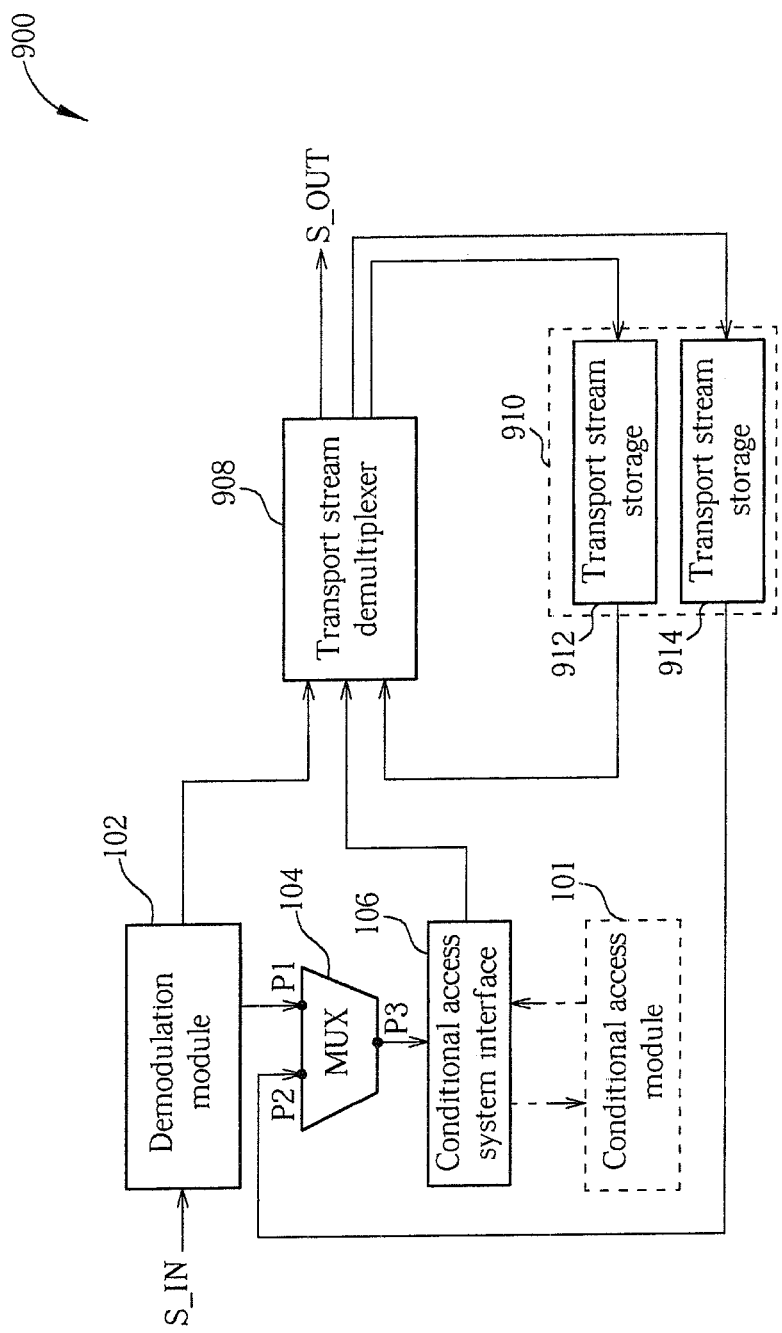
FIG. 9 is a diagram illustrating a third exemplary embodiment of a transport stream processing apparatus according to the present invention.

FIG. 9 is a diagram illustrating a third exemplary embodiment of a transport stream processing apparatus according to the present invention. The configuration of the transport stream processing apparatus 900 shown in FIG. 9 is similar to that of the transport stream processing apparatus 100 shown in FIG. 1. The major difference is that a transport stream storage 910 of the exemplary transport stream processing apparatus 900 has two transport stream storages 912 and 914 which are physically independent of each other. The transport stream storages 912 and 914 can be implemented using individual storage devices, or implemented using individual storage spaces arranged in a single storage device. The transport stream storage 912 is implemented to store a transport stream generated by a PVR operation when no conditional access module is coupled to the conditional access system interface 106 or the conditional access module 101 is coupled to the conditional access system interface 106 and complies with a first conditional access specification (e.g., the POD/CI specification), while the transport stream storage 914 is implemented to store a transport stream generated by a PVR operation when the conditional access module 101 is coupled to the conditional access system interface 106 and complies with a second conditional access specification (e.g., the CI+ specification) different from the first conditional access specification.

Figure 10:
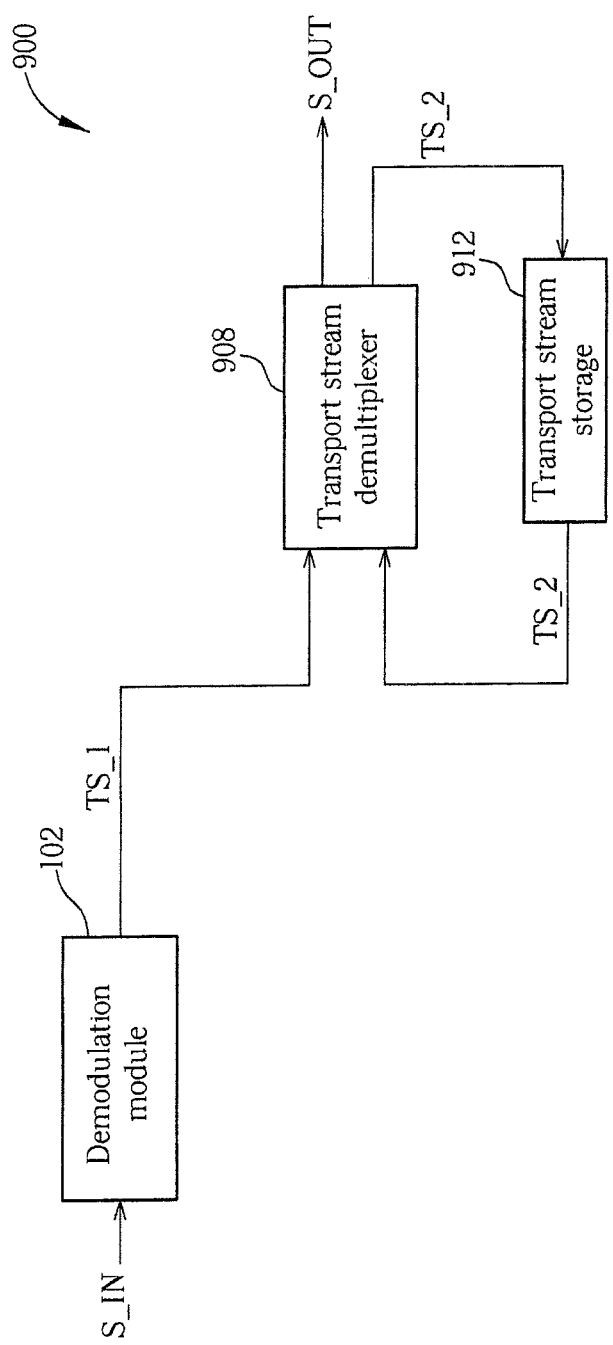

Similarly, the transport stream processing apparatus 900 shown in FIG. 9 can handle the PVR function for recording a transport stream and the playback function of the recorded transport stream under different conditions. Please refer to FIG. 10 in conjunction with FIG. 9. FIG. 10 is a diagram illustrating the transport stream processing apparatus 900 operating with no conditional access module plugged in. As there is no conditional access module coupled to the conditional access system interface 106, the demodulation module 102 demodulates the input signal S_IN to generate a first transport stream TS_1 to the transport stream demultiplexer 908. The transport stream demultiplexer 908 then performs the PVR operation upon the first transport stream TS_1 to thereby record a second transport stream TS_2 into the transport stream storage 912. Regarding the playback of the second transport stream TS_2 recorded in the transport stream storage 912, the transport stream demultiplexer 908 demultiplexs information transmitted via an incoming transport stream (e.g., the recorded second transport stream TS_2) to generate the output signal S_OUT to the following signal processing stage for further signal processing.

Figure 11:
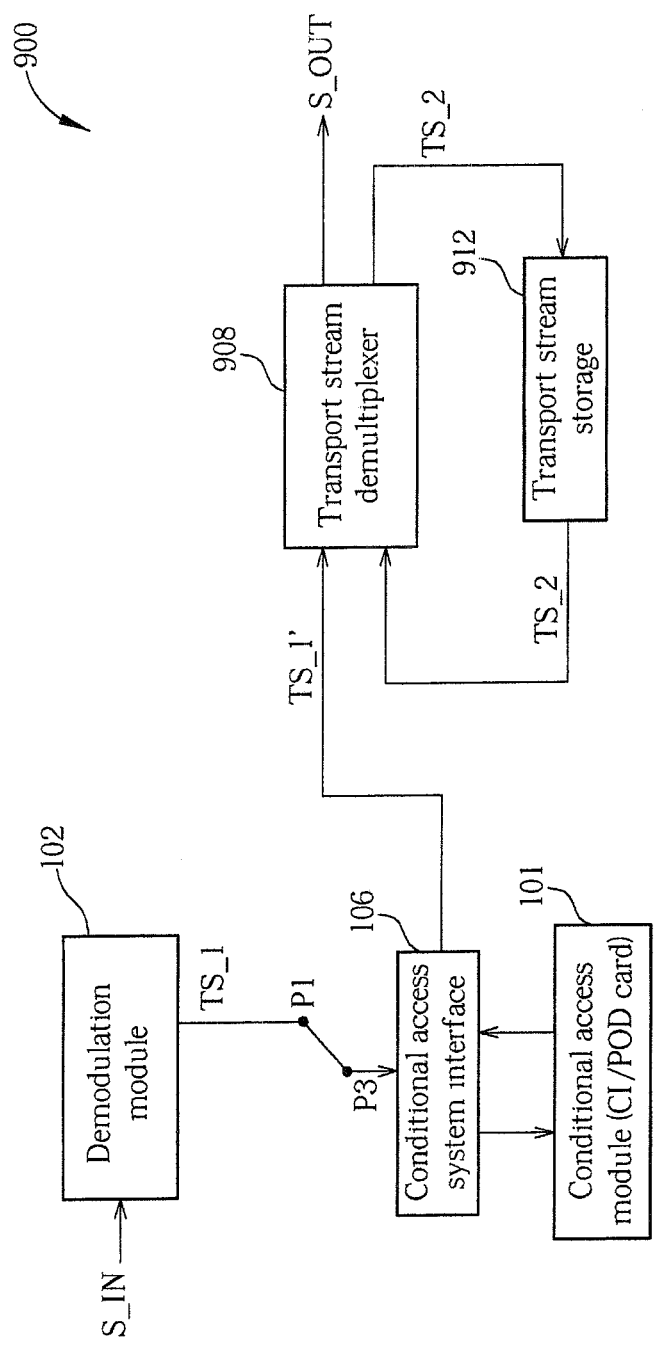

Please refer to FIG. 11 in conjunction with FIG. 9. FIG. 11 is a diagram illustrating the transport stream processing apparatus 900 operating with a CI/POD card plugged in. In this exemplary embodiment, the conditional access module 101 complying with the CI or POD specification is connected to the conditional access system interface 106. Therefore, the multiplexer 104 is controlled to couple the input port P1 to the output port P3. The demodulation module 102 demodulates the input signal S_IN to generate a first transport stream TS_1 to the conditional access module 101 for signal processing (e.g., descrambling). Next, the conditional access system interface 106 transmits a processed transport stream TS_1' generated from the conditional access module 101 to the transport stream demultiplexer 908. The transport stream demultiplexer 908 then performs the PVR operation upon the processed transport stream TS_1' to thereby record a second transport stream TS_2 into the transport stream storage 912. Regarding the playback of the second transport stream TS_2 recorded in the transport stream storage 912, the transport stream demultiplexer 108 demultiplexs information transmitted via an incoming transport stream (e.g., the recorded second transport stream TS_2) to generate the output signal S_OUT to the following signal processing stage for further signal processing.

Figure 12:
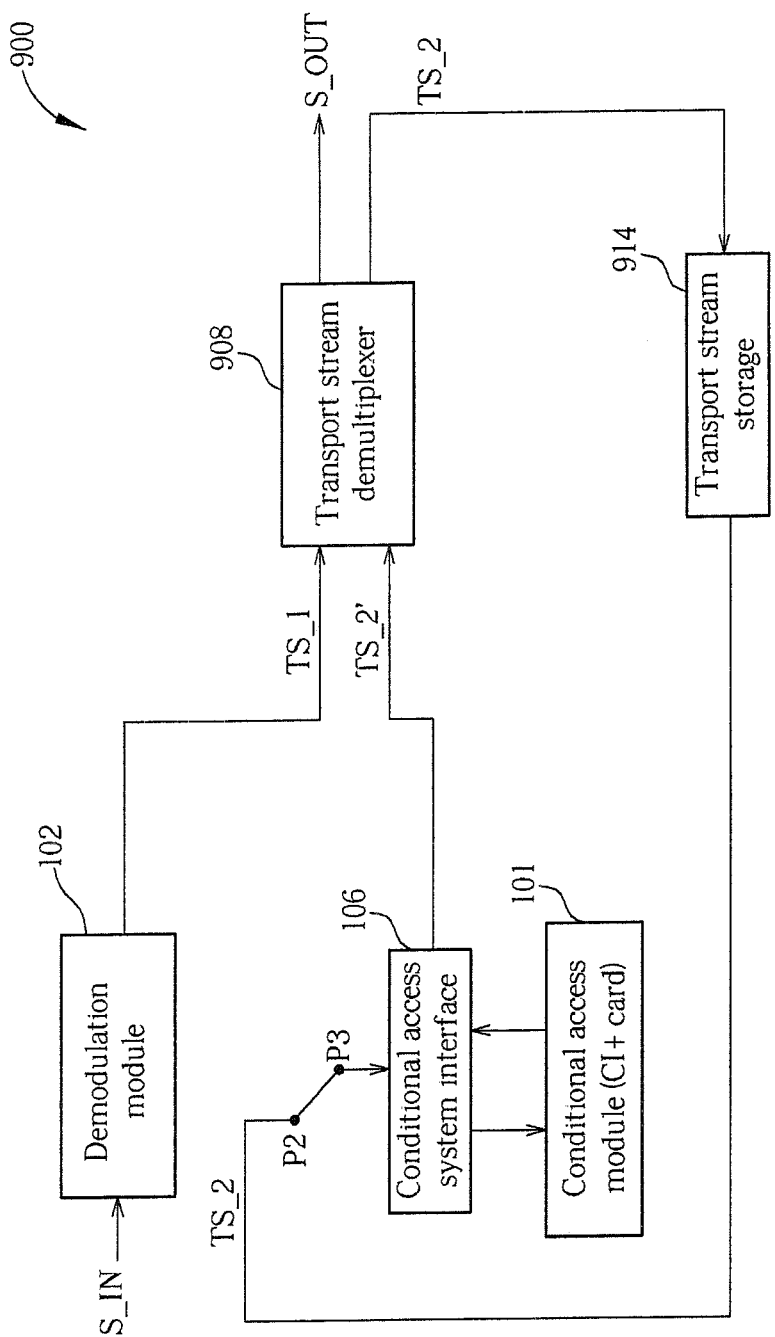

Please refer to FIG. 12 in conjunction with FIG. 9. FIG. 12 is a diagram illustrating the transport stream processing apparatus 900 in FIG. 9 operating with a CI+ card plugged in. In this exemplary embodiment, the conditional access module 101 complying with the CI+ specification is connected to the conditional access system interface 106. Therefore, the multiplexer 104 is controlled to couple the input port P2 to the output port P3. The demodulation module 102 demodulates the input signal S_IN to generate a first transport stream TS_1 to the transport stream demultiplexer 908. The transport stream demultiplexer then 108 performs the PVR operation upon the first transport stream TS_1 to thereby record a second transport stream TS_2 into the transport stream storage 914. Regarding the playback of the second transport stream TS_2 recorded in the transport stream storage 914, the second transport stream TS_2 is transmitted to the conditional access module 101 for signal processing (e.g., descrambling), and then the conditional access system interface 106 transmits a processed transport stream TS_2' generated from the conditional access module 101 to the transport stream demultiplexer 908. Next, the transport stream demultiplexer 908 demultiplexs information transmitted via an incoming transport stream (e.g., the processed transport stream TS_2') to generate the output signal S_OUT to the following signal processing stage for further signal processing.

Compared to the transport stream processing apparatuses shown in FIG. 1 and FIG. 5, the transport stream processing apparatus 900 in FIG. 9 needs neither the switch module nor the multiplexer to control the data path of the recorded transport stream due to the implementation of two individual transport stream storages 912 and 914.

Figure 13:
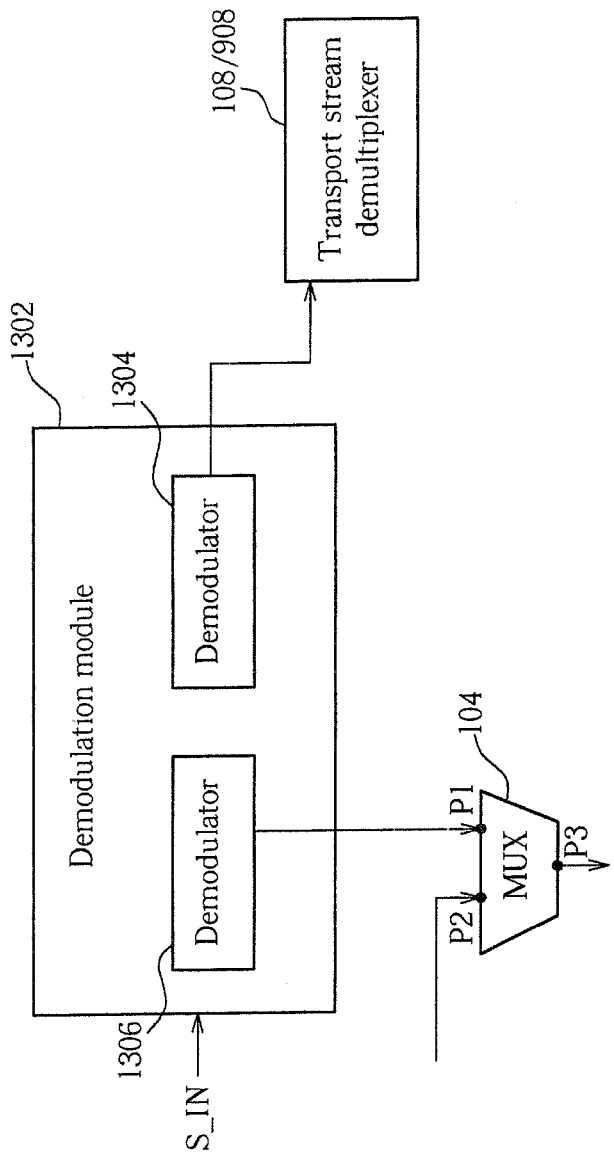
FIG. 13 is a block diagram illustrating an exemplary embodiment of a demodulation module with two demodulators implemented therein.

As shown in FIGS. 1, 5, and 9, the demodulation module 102 generates a transport stream to the transport stream demultiplexer 108/908 when no conditional access module is coupled to the conditional access system interface 106 or the conditional access module 101 is coupled to the conditional access system interface 106 and complies with the CI+ specification; on the contrary, the demodulation module 102 generates a transport stream to the multiplexer 104 when the conditional access module 101 is coupled to the conditional access system interface 106 and complies with the CI or POD specification. In an exemplary implementation, the demodulation module 102 is implemented using a single demodulator which selectively generates its output to the transport stream demultiplexer 108/908 or the input port P1 of the multiplexer 104. However, other alternative designs are feasible. For example, the demodulation module could be implemented using two demodulators which are physically independent of each other. One of the demodulators is dedicated to generating a transport stream output to the transport stream demultiplexer 108/908, and the other of the demodulators is dedicated to generating a transport stream output to the input port P1 of the multiplexer 104. Please refer to FIG. 13. FIG. 13 is a block diagram illustrating an exemplary embodiment of a demodulation module with two demodulators implemented therein. As shown, the demodulator 1304 is configured to generate a transport stream to the transport stream demultiplexer 108/908 when no conditional access module is coupled to the conditional access system interface 106 or the conditional access module 101 is coupled to the conditional access system interface 106 and complies with the CI+ specification, and the other demodulator 1306 is configured to generate a transport stream to the input port P1 of the multiplexer 104 when the conditional access module 101 is coupled to the conditional access system interface 106 and complies with the CI or POD specification. In one implementation, a single tuner can be shared by both demodulators 1304 and 1306. As a result, the input signal S_IN generated by the shared tuner is transmitted to the demodulators 1304 and 1306. In another implementation, two individual tuners are coupled to the demodulators 1304 and 1306, respectively. Therefore, the input signal S_IN includes a first down-conversion result and a second down-conversion result, where the first down-conversion result is generated by one tuner and is transmitted to the demodulator 1304, and the second down-conversion result is generated by the other tuner and is transmitted to the demodulator 1306.

In conclusion, the present invention provides a transport stream processing apparatus that could handle the Personal Video Record (PVR) function for recording a transport stream and the playback function of the recorded transport stream under a condition where a Common Interface Plus (CI+) card is plugged in, a condition where a CI/POD card is plugged in, or a condition where no card is plugged in. Thus, the transport stream processing apparatus can handle both scrambled TS and descrambled TS stored in the transport stream storage module. In a first exemplary embodiment of the transport stream processing apparatus, a multiplexer and a switch module are implemented to control the data path of the transport stream. In a second exemplary embodiment of the transport stream processing apparatus, a plurality of multiplexers are implemented to control the data path of the transport stream. In a third exemplary embodiment of the transport stream processing apparatus, a multiplexer and a plurality of transport stream storages are implemented to control the data path of the transport stream. In this way, this invention proposes a plurality of transport stream processing apparatuses each compatible with different condition access system specifications. Specifically, each of the exemplary transport stream processing apparatuses is capable of storing a transport stream before the transport stream is descrambled and then descrambling the stored transport stream for playback.

Those skilled in the art will readily observe that numerous modifications and alterations of the device and method may be made while retaining the teachings of the invention.

The invention claimed is:

1. A transport stream processing apparatus, comprising:
   a demodulator, configured for demodulating an input signal to generate a first transport stream;
   a transport stream storage, configured for storing a second transport stream;
   a multiplexer, having an output port, a first input port configured for receiving the first transport stream, and a second input port configured for receiving the second transport stream, wherein the multiplexer selectively couples the first input port or the second input port to the output port; and
   a conditional access system interface, coupled to the output port of the multiplexer and configured for coupling a conditional access card, wherein the conditional access system interface transmits a transport stream outputted from the output port of the multiplexer to the conditional access card for signal processing when the conditional access card is coupled to the conditional access system interface;
   wherein the multiplexer couples the first input port to the output port when the conditional access card is coupled to the conditional access system interface and complies with a first conditional access specification, and couples the second input port to the output port when the conditional access card is coupled to the conditional access system interface and complies with a second conditional access specification different from the first conditional access specification.

2. The transport stream processing apparatus of claim 1, wherein the second conditional access specification is a Common Interface Plus (CI+) specification.

3. The transport stream processing apparatus of claim 1, wherein the first conditional access specification is a Common Interface (CI) specification or a Point of Deployment (POD) specification.

4. The transport stream processing apparatus of claim 1, further comprising:
   a transport stream demultiplexer, coupled to the demodulator and the conditional access system interface, for processing an output of the demodulator to thereby record the second transport stream into the transport stream storage when the conditional access card is coupled to the conditional access system interface and complies with the second conditional access specification, and for processing an output of the conditional access card to thereby record the second transport stream into the transport stream storage when the conditional access card is coupled to the conditional access system interface and complies with the first conditional access specification.

5. The transport stream processing apparatus of claim 4, wherein the demodulator comprises:
   a first demodulator, coupled to the first input port of the multiplexer and configured for generating the first transport stream to the multiplexer; and
   a second demodulator, coupled to the transport stream demultiplexer and configured for generating a third transport stream to the transport stream demultiplexer, wherein the second demodulator is physically independent of the first demodulator.

6. The transport stream processing apparatus of claim 4, wherein the transport stream storage comprises:
   a first transport stream storage, configured for storing the second transport stream generated by the transport stream demultiplexer processing the output of the demodulator; and
   a second transport stream storage, configured for storing the second transport stream generated by the transport stream demultiplexer processing the output of the conditional access card when the conditional access card is coupled to the conditional access system interface, wherein the second transport stream storage is physically independent of the first transport stream storage.

7. The transport stream processing apparatus of claim 1, wherein the second transport stream is a scrambled transport stream.

8. A transport stream processing apparatus, comprising:
   a transport stream storage, configured for storing a transport stream;
   a transport stream demultiplexer, configured for demultiplexing information transmitted via a first incoming transport stream;
   a conditional access system interface, coupled to the transport stream demultiplexer and configured for coupling a conditional access card, wherein when the conditional access card is coupled to the conditional access system interface, the conditional access system interface transmits a second incoming transport stream to the conditional access card for signal processing, and transmits a processed transport stream generated from the conditional access card to the transport stream demultiplexer; and
   a switch, having an input port coupled to the transport stream storage for receiving the transport stream stored in the transport stream storage, a first output port coupled to the transport stream demultiplexer, and a second output port coupled to the conditional access system interface, wherein the switch selectively transmits the transport stream received at the input port to the transport stream demultiplexer via the first output port or the conditional access system interface via the second output port;
   wherein the switch couples the input port to the first output port when the conditional access card is coupled to the conditional access system interface and complies with a first conditional access specification, and couples the input port to the second output port when the conditional access card is coupled to the conditional access system interface and complies with a second conditional access specification different from the first conditional access specification.

9. The transport stream processing apparatus of claim 8, wherein the second conditional access specification is a Common Interface Plus (CI+) specification.

10. A transport stream processing apparatus, comprising:
    a transport stream storage, configured for storing a transport stream;
    a transport stream demultiplexer, configured for demultiplexing information transmitted via a first incoming transport stream;
    a conditional access system interface, coupled to the transport stream demultiplexer and configured for coupling a conditional access card, wherein when the conditional access card is coupled to the conditional access system interface, the conditional access system interface transmits a second incoming transport stream to the conditional access card for signal processing, and transmits a processed transport stream generated from the conditional access card to the transport stream demultiplexer; and a switch, having an input port coupled to the transport stream storage for receiving the transport stream stored in the transport stream storage, a first output port coupled to the transport stream demultiplexer, and a second output port coupled to the conditional access system interface, wherein the switch selectively transmits the transport stream received at the input port to the transport stream demultiplexer via the first output port or the conditional access system interface via the second output port;

wherein the switch couples the input port to the first output port when there is no conditional access card coupled to the conditional access system interface, and couples the input port to the second output port when the conditional access card is coupled to the conditional access system interface and complies with a specific conditional access specification.

11. The transport stream processing apparatus of claim 10, wherein the specific conditional access specification is a Common Interface Plus (CI+) specification.

12. A transport stream processing apparatus, comprising:
a transport stream storage, configured for storing a transport stream;
a transport stream demultiplexer, configured for demultiplexing information transmitted via an incoming transport stream;
a multiplexer, having a first input port coupled to the transport stream storage for receiving the transport stream stored in the transport stream storage, a second input port, and an output port coupled to the transport stream demultiplexer, wherein the multiplexer selectively couples the first input port or the second input port to the output port; and
a conditional access system interface, coupled to the transport stream storage and the second input port of the multiplexer, the conditional access system interface configured for coupling a conditional access card, wherein when the conditional access card is coupled to the conditional access system interface, the conditional access system interface transmits the transport stream stored in the transport stream storage to the conditional access card for signal processing, and transmits a processed transport stream generated from the conditional access card to the second input port of the multiplexer;
wherein the multiplexer couples the first input port to the output port when the conditional access card is coupled to the conditional access system interface and complies with a first conditional access specification, and couples the second input port to the output port when the conditional access card is coupled to the conditional access system interface and complies with a second conditional access specification different from the first conditional access specification.

13. The transport stream processing apparatus of claim 12, wherein the second conditional access specification is a Common Interface Plus (CI+) specification.

14. A transport stream processing apparatus, comprising:
a transport stream storage, configured for storing a transport stream;
a transport stream demultiplexer, configured for demultiplexing information transmitted via an incoming transport stream;
a multiplexer, having a first input port coupled to the transport stream storage for receiving the transport stream stored in the transport stream storage, a second input port, and an output port coupled to the transport stream demultiplexer, wherein the multiplexer selectively couples the first input port or the second input port to the output port; and
a conditional access system interface, coupled to the transport stream storage and the second input port of the multiplexer, the conditional access system interface configured for coupling a conditional access card, wherein when the conditional access card is coupled to the conditional access system interface, the conditional access system interface transmits the transport stream stored in the transport stream storage to the conditional access card for signal processing, and transmits a processed transport stream generated from the conditional access card to the second input port of the multiplexer;
wherein the multiplexer couples the first input port to the output port when there is no conditional access card coupled to the conditional access system interface, and couples the second input port to the output port when the conditional access card is coupled to the conditional access system interface and complies with a specific conditional access specification.

15. The transport stream processing apparatus of claim 14, wherein the specific conditional access specification is a Common Interface Plus (CI+) specification.

16. A transport stream processing apparatus, comprising:
a first transport stream storage, configured for storing a first transport stream; and
a second transport stream storage, configured for storing a second transport stream, wherein the second transport stream storage is physically independent of the first transport stream storage;
a conditional access system interface, coupled to the second transport stream storage and configured for coupling a conditional access card, wherein when the conditional access card is coupled to the conditional access system interface, the conditional access system interface transmits the second transport stream stored in the second transport stream storage to the conditional access card for signal processing, and outputs a processed transport stream generated from the conditional access card; and
a transport stream demultiplexer, coupled to the first transport stream storage and the conditional access system interface, the transport stream demultiplexer configured for demultiplexing information transmitted via the first transport stream or the processed transport stream;
wherein the conditional access system interface transmits the second transport stream stored in the second transport stream storage to the conditional access card when the conditional access card coupled to the conditional access system interface complies with a Common Interface Plus (CI+) specification.

17. A transport stream processing apparatus, comprising:
a demodulator, configured for demodulating an input signal to generate a first transport stream;
a transport stream storage;
a transport stream demultiplexer, coupled to the demodulator and configured for processing the first transport stream to record a second transport stream into the transport stream storage; and
a conditional access card;
wherein the second transport stream is scrambled, the conditional access card is coupled to the transport stream storage and the transport stream demultiplexer, the conditional access card processes the second transport stream stored in the transport stream storage to generate a processed transport stream to the transport stream demultiplexer, and the transport stream demultiplexer demultiplexs information transmitted via the processed transport stream.

18. A transport stream processing apparatus, comprising:
a demodulator, configured for demodulating an input signal to generate a first transport stream;
a transport stream storage;
a transport stream demultiplexer, coupled to the demodulator and configured for processing the first transport stream to record a second transport stream into the transport stream storage; and
a conditional access card;
wherein the second transport stream is scrambled, and the conditional access card complies with a Common Interface Plus (CI+) specification.

* * * * *